United States Patent
Cocchi et al.

(10) Patent No.: US 10,477,879 B2
(45) Date of Patent: Nov. 19, 2019

(54) MACHINE FOR MAKING LIQUID OR SEMI-LIQUID FOOD PRODUCTS AND METHOD OF OPERATING THE MACHINE

(71) Applicant: ALI GROUP S.r.l.—CARPIGIANI, Cernusco Sul Naviglio (Milan) (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 0 days.

(21) Appl. No.: 16/000,449

(22) Filed: Jun. 5, 2018

(65) Prior Publication Data

US 2018/0368440 A1    Dec. 27, 2018

(30) Foreign Application Priority Data

Jun. 21, 2017   (IT) .................... 102017000069237

(51) Int. Cl.
*A23G 9/28* (2006.01)
*A23G 9/16* (2006.01)

(52) U.S. Cl.
CPC ............. *A23G 9/287* (2013.01); *A23G 9/16* (2013.01); *A23G 9/28* (2013.01); *A23G 9/281* (2013.01); *A23G 9/283* (2013.01)

(58) Field of Classification Search
CPC . A23G 9/16; A23G 9/28; A23G 9/281; A23G 9/283; A23G 9/287

(Continued)

(56) References Cited

U.S. PATENT DOCUMENTS 4,889,210 A * 12/1989 Alcaraz .................. A23G 9/28
                                                                 186/38
5,025,840 A *  6/1991 Tacke .................... A23G 9/163
                                                                 141/251

(Continued)

FOREIGN PATENT DOCUMENTS

| EP | 2484224 A1 | 8/2012 |
|---|---|---|
| EP | 3172970 A1 | 5/2017 |
| JP | H0870783 A | 3/1996 |

OTHER PUBLICATIONS

Italian Search Report dated Feb. 9, 2018 from counterpart II App No. 201700069237.

*Primary Examiner* — Vishal Pancholi
(74) *Attorney, Agent, or Firm* — Shuttleworth & Ingersoll, PLC; Timothy J. Klima

(57) ABSTRACT

A machine for making liquid or semi-liquid food products includes a processing chamber for processing a basic mixture and including a stirrer and thermal treatment system operating in conjunction to convert the basic mixture into a liquid or semi-liquid product; an electronic drive and control unit; a dispensing device having a dispensing nozzle connected to the processing chamber to deliver the product; a support having a seat for housing a receiving container; a movement device for vertically moving the support between a vertical position away from the nozzle and a vertical position close to the nozzle; and a device for rotating the housing seat about a vertical axis. The electronic drive and control unit is operatively connected to the movement device and to the device for rotating the housing seat to drive them according to a predetermined law of motion.

15 Claims, 9 Drawing Sheets

(58) Field of Classification Search
USPC .................................. 222/52, 63, 145.6, 333
See application file for complete search history.

(56) References Cited

U.S. PATENT DOCUMENTS

| | | | | |
|---|---|---|---|---|
| 6,390,334 | B1* | 5/2002 | Kim | A23G 9/28 |
| | | | | 222/146.6 |
| 7,052,728 | B2* | 5/2006 | Kateman | A23G 9/045 |
| | | | | 426/515 |
| 7,896,038 | B2* | 3/2011 | Jones | A23G 9/22 |
| | | | | 141/103 |
| 2003/0160073 | A1 | 8/2003 | Gispert Casino et al. | |
| 2007/0199614 | A1* | 8/2007 | Cocchi | A23G 9/28 |
| | | | | 141/83 |

* cited by examiner

MACHINE FOR MAKING LIQUID OR SEMI-LIQUID FOOD PRODUCTS AND METHOD OF OPERATING THE MACHINE

This application claims priority to Italian Patent Application 102017000069237 filed Jun. 21, 2017, the entirety of which is incorporated by reference herein.

BACKGROUND OF THE INVENTION

This invention addresses the machine manufacturing sector relating to machines for making ice cream, more precisely, machines for making soft ice cream, or more generally speaking, liquid or semi-liquid food products.

More specifically, this invention relates to a machine for making liquid or semi-liquid food products and to a method of operating the machine.

A particularly strongly felt need in the ice cream trade is that of being able to dispense the ice cream effectively in such a way that the portions in the container it is served in (e.g. cone or cup) have a repeatable and uniform shape.

SUMMARY OF THE INVENTION

This disclosure therefore has for an aim to meet the above mentioned need.

More specifically, the aim of this invention is to provide a machine for making liquid or semi-liquid food products and a method of operating the machine to allow dispensing the ice cream in such a way as to ensure that it has a predetermined, repeatable and precise shape.

Another aim of this invention is to provide a machine for making liquid or semi-liquid food products and a method of operating the machine to allow dispensing the ice cream in a such a way that it can be served in a variety of shapes.

According to the disclosure, these aims are achieved by a machine for making liquid or semi-liquid food products and a method of operating the machine comprising the technical features set out in the present disclosure.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

Figure 1:
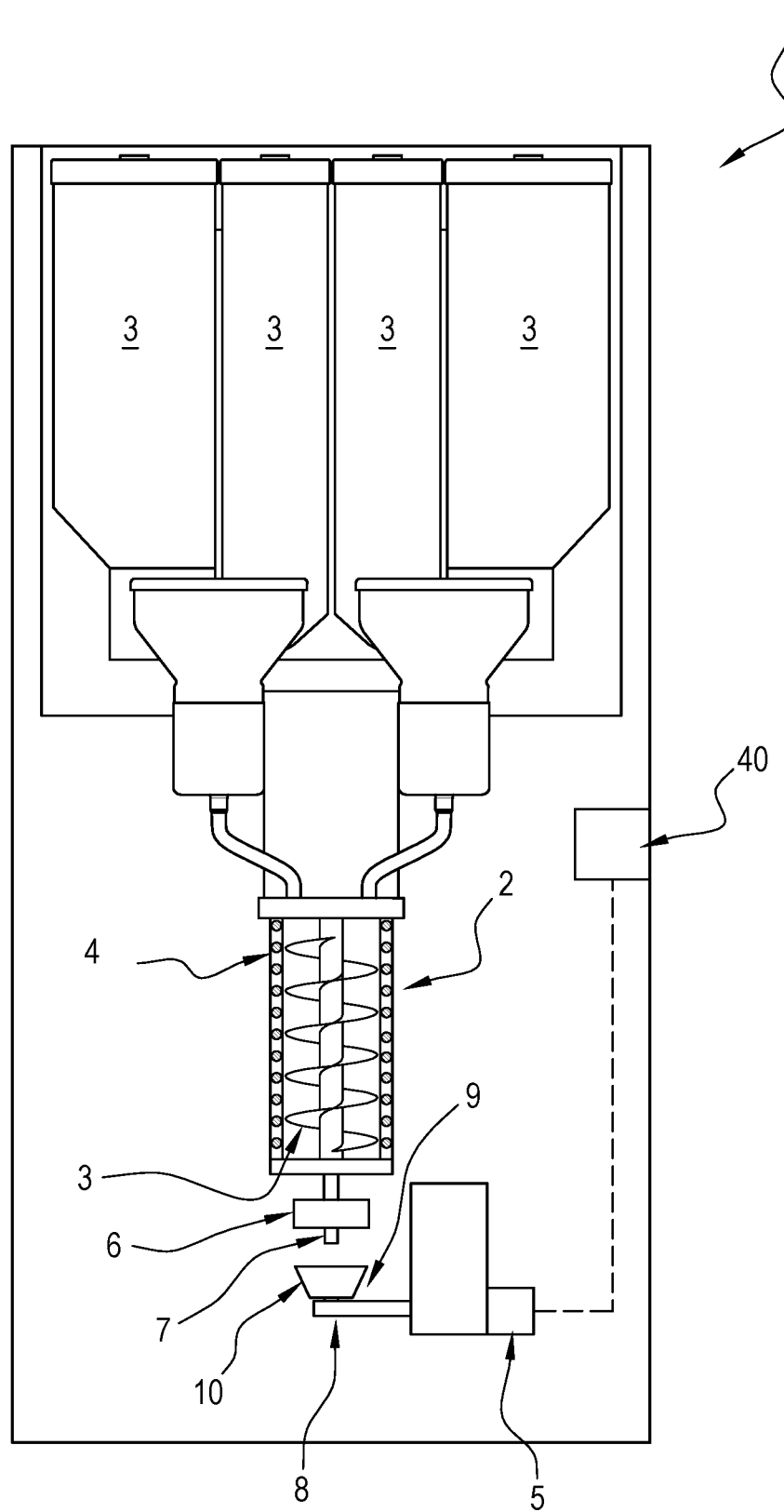
FIG. 1 is a schematic side view of a machine of this invention for making liquid or semi-liquid products.
Figure 2:
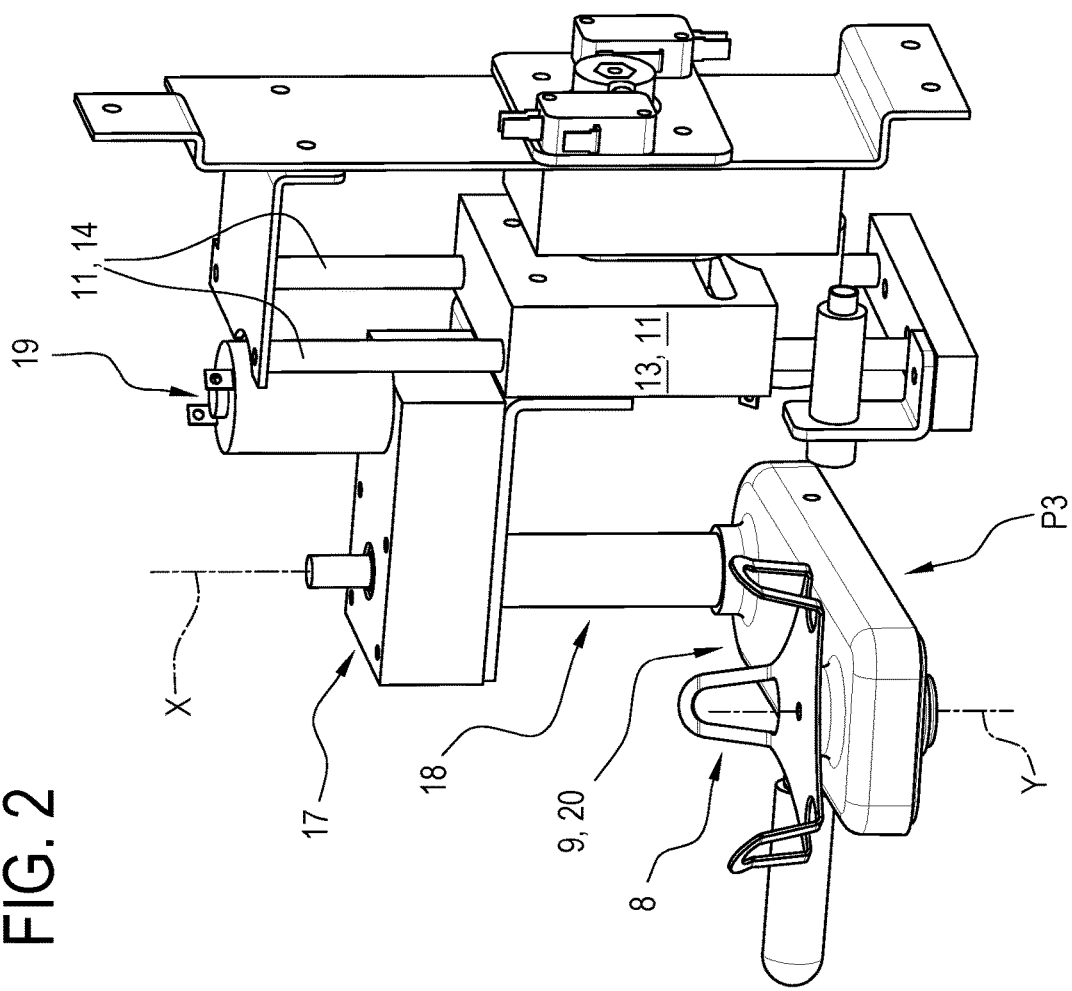
FIGS. 2 to 5 illustrate respective perspective views of a detail of the machine of FIG. 1 in different operating configurations.
Figure 3:
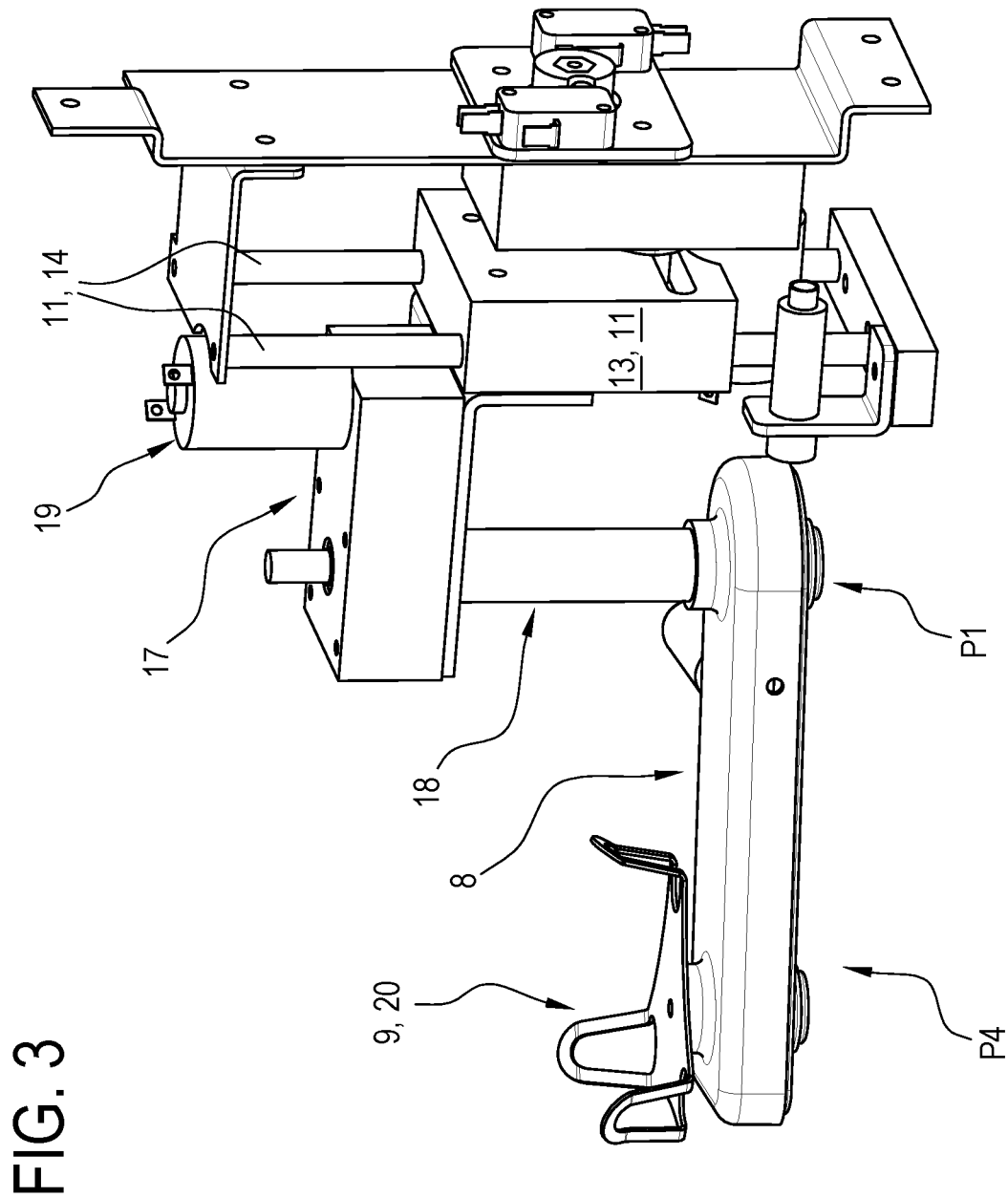
Figure 4:
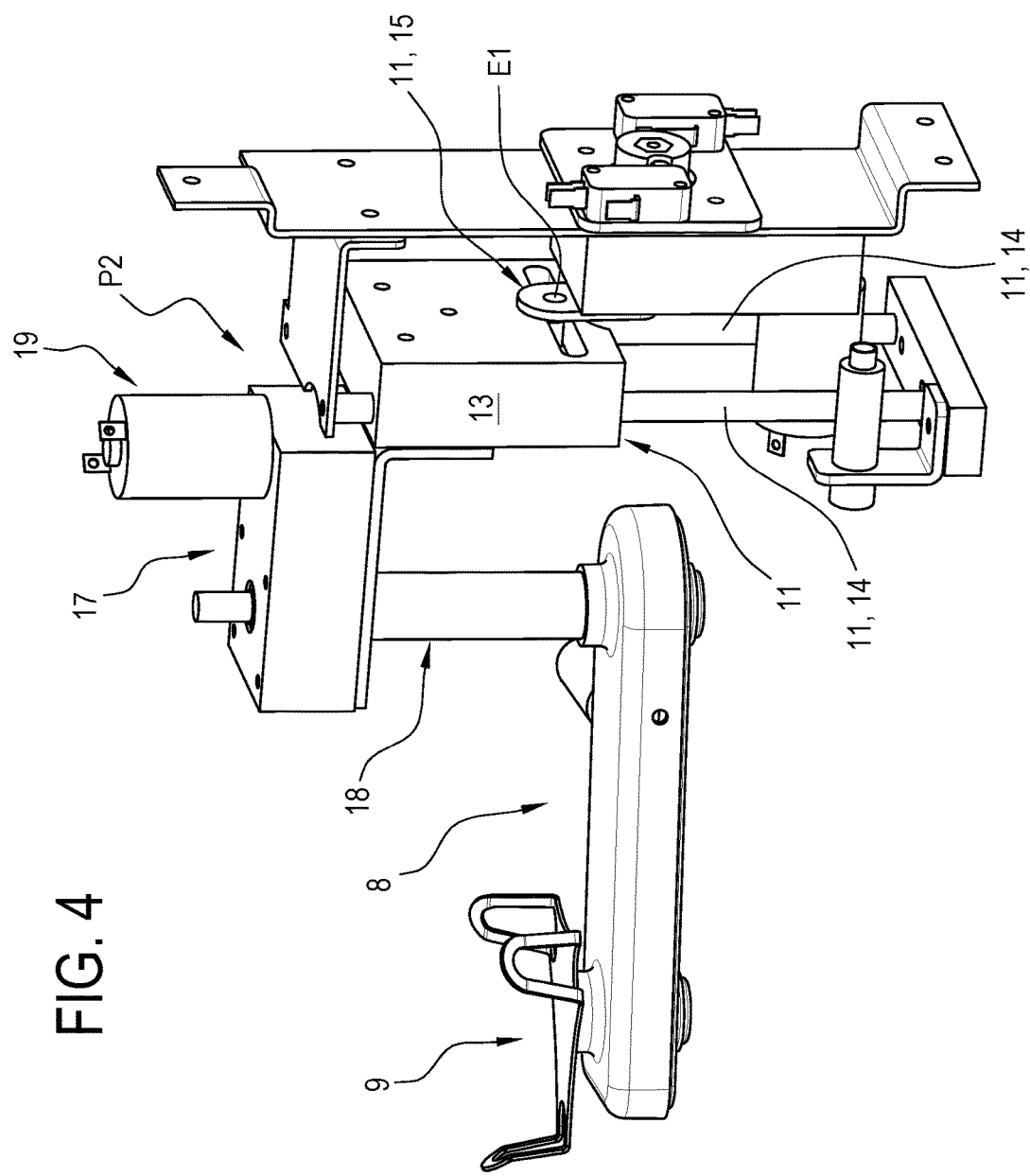
Figure 5:
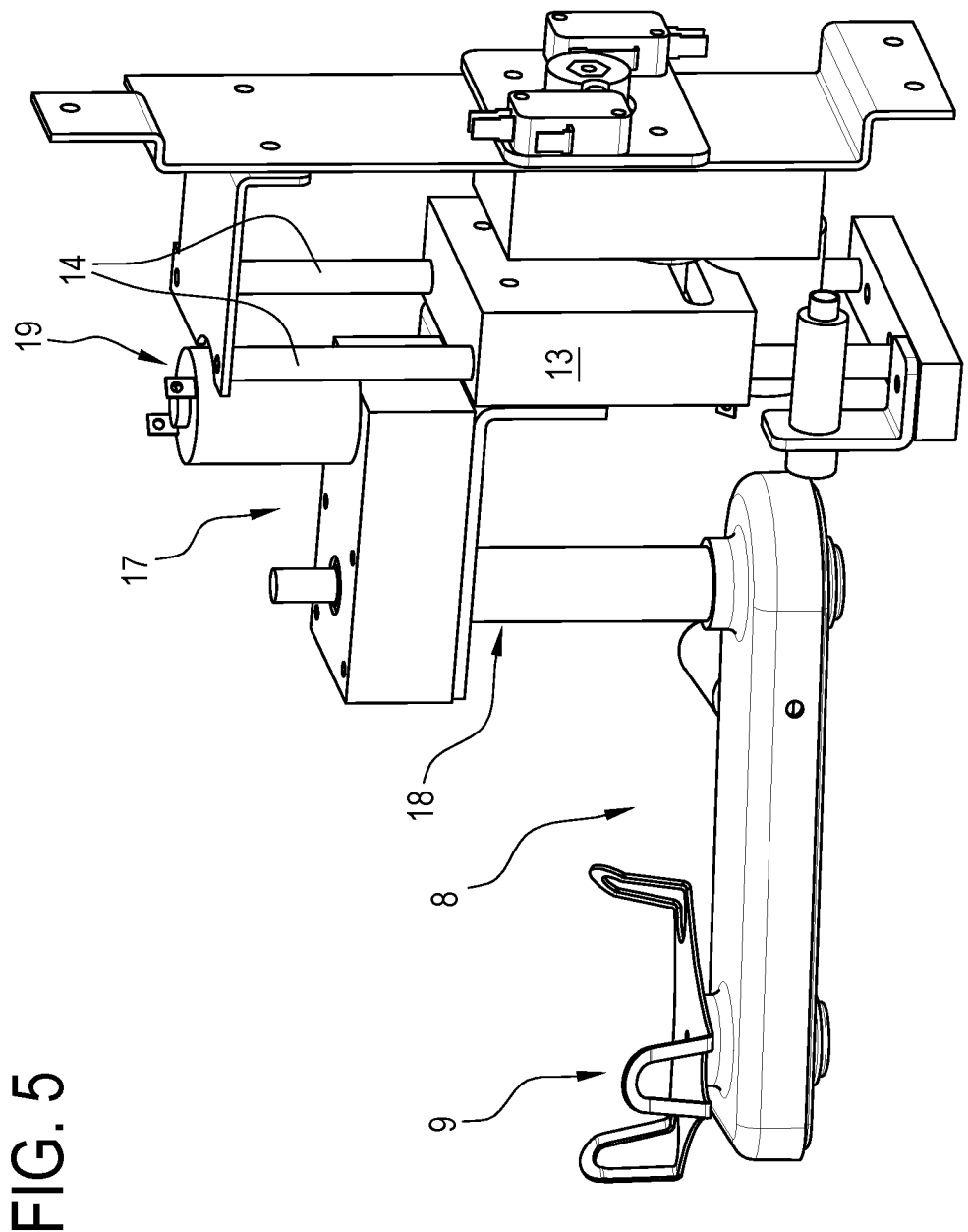

With reference to the accompanying drawings, the numeral 1 denotes an apparatus or machine for making liquid or semi-liquid products.

Preferably, the machine 1 is a machine for making ice cream (preferably soft ice cream).

The machine 1 for making liquid or semi-liquid food products comprises:

a processing chamber 2 for processing a basic mixture and provided with a stirrer 3 and with thermal treatment means 4 for the basic mixture, operating in conjunction with one another to convert the basic mixture into a (finished) liquid or semi-liquid product;

an electronic drive and control unit 5;

a dispensing device 6 having a dispensing nozzle 7 connected to the processing chamber 2 to deliver the liquid or semi-liquid product.

According to another aspect, the machine 1 comprises:

a support 8 having a seat 9 for housing a receiving container 10;

movement means 11 for vertically moving the support 8 between a vertical position P1 away from the dispensing nozzle 7 and a vertical position P2 close to the nozzle 7;

means 12 for rotating the housing seat 9 and configured to allow the housing seat 9 to be rotated about a vertical axis Y.

Preferably, the thermal (cooling) treatment means 4 of the basic mixture comprise a first heat exchanger (evaporator) associated with the processing chamber 2, a compressor, a pressure reducing element, and a second heat exchanger (condenser), forming part of a circuit in which a heat exchanger fluid circulates.

The parts, namely first heat exchanger (evaporator) associated with the processing chamber 2, compressor, pressure reducing element, and second heat exchanger (condenser), define a thermodynamic system operating according to a thermodynamic cycle.

Preferably, the stirrer 3 has a shaft and a set of radial blades.

The radial blades of the stirrer 3 are configured to scrape the surface (preferably the cold, inside surface) of the processing chamber 2.

Preferably, the shaft of the stirrer 3 has an axis of rotation which, in use, is oriented vertically.

Preferably, the processing chamber 2 is a processing cylinder.

Preferably, the processing cylinder has a vertical axis.

According to another aspect, the electronic drive and control unit 5 is operatively connected to the movement means 11 and to the means 12 for vertically rotating the housing seat 9 in order to drive them according to a predetermined law of motion.

It should be noted that the spaced-apart position P1 is at a level vertically below the vertical close-together position P2.

According to another aspect, the movement means 11 for vertically moving the support 8 between a vertical position P1 away from the dispensing nozzle 7 and a vertical position P2 close to the nozzle 7 comprise a slide 13, which the support 8 is mechanically connected to, and at least one guide 14 for vertically guiding the slide 13 (the slide 13 is slidably coupled to the at least one guide 14).

According to another aspect, the movement means 11 for vertically moving the support 8 comprise a pair of guides 14 which the slide 13 is slidably coupled to.

According to another aspect, the vertical movement means 11 preferably comprise a conrod 15 which is slidably connected, at a first end of it E1, to the slide 13.

More specifically, the slide 13 is provided with a slot 30 which is slidably engaged by the first end E1 of the conrod 15.

More specifically, the machine comprises a pin 31 which is connected to the first end E1 of the conrod 15.

In use, the pin 31 is (slidably) inserted in the slot 30 of the slide 13.

At a second end E2 of it, the conrod 15 is also connected to a shaft 16 driven by an actuator (motor) 33.

Consequently, the actuator (motor) 33 drives the shaft 16 in rotation and causes the conrod 15 to be driven in rotation as one with the shaft 16 (the conrod 15 thus rotates about a horizontal axis K).

Rotation of the conrod 15 causes the slide 13 to move (vertically) translationally along the guide/guides 14.

By effect of the rotation of the conrod 15, the pin 31 moves in the slot 30, in turn causing the slide 13 to move vertically.

It should be noted that the direction of rotation of the actuator shaft 16 is preferably never reversed by the passage from the vertical, spaced-apart position P1 to the vertical, close-together position P2 and then from the vertical, close-together position P2 to the vertical, spaced-apart position P1.

In effect, when the slide 13 is at the vertical, close-together position P2 or at the vertical, spaced-apart position P1, the conrod 15 is disposed with its two ends vertically aligned.

According to another aspect, the support 8 is rotatable relative to the slide 13 about a vertical axis X between a (horizontal) idle position (away from the nozzle 7) and a (horizontal) working position (close to the nozzle 7).

More precisely, as illustrated, the vertical movement means 11 of the support 8 comprise an element 17 which is cantilevered from the slide 13.

The cantilevered element 17 rotatably supports a shaft 18.

The support 8 is solidly connected to the shaft 18 to rotate as one therewith.

It should be noted that the cantilevered element 17 also supports a motor 19 (electric) mechanically connected to the shaft 18.

More specifically, the (electric) motor 19 has a shaft which is mechanically connected (by a belt, pulley or gear) to the shaft 18 so that rotation of the shaft of the motor 19 causes rotation of the shaft 18 and, consequently, rotation of support 8 about the vertical axis X.

It should be noted that the support 8 is elongate in shape and extends mainly in a horizontal plane.

Preferably, the support 8 is made up of two half-shells 8A and 8B coupled to one another (a top half-shell 8A and a bottom half-shell 8B). The two half-shells 8A and 8B (clearly shown in FIG. 9) define a hollow space inside them.

The seat 9 which houses a receiving container 10 comprises a housing element 20 rotatably connected to (rotatably mounted on) the support 8.

More specifically, the housing element 20 is disposed on one of the two half-shells (8A).

It should be noted that the support 8s rotatably mounts the element 20.

Preferably, the element 20 has a supporting base 21 and a plurality of radial wings protruding vertically upward.

Figure 6:
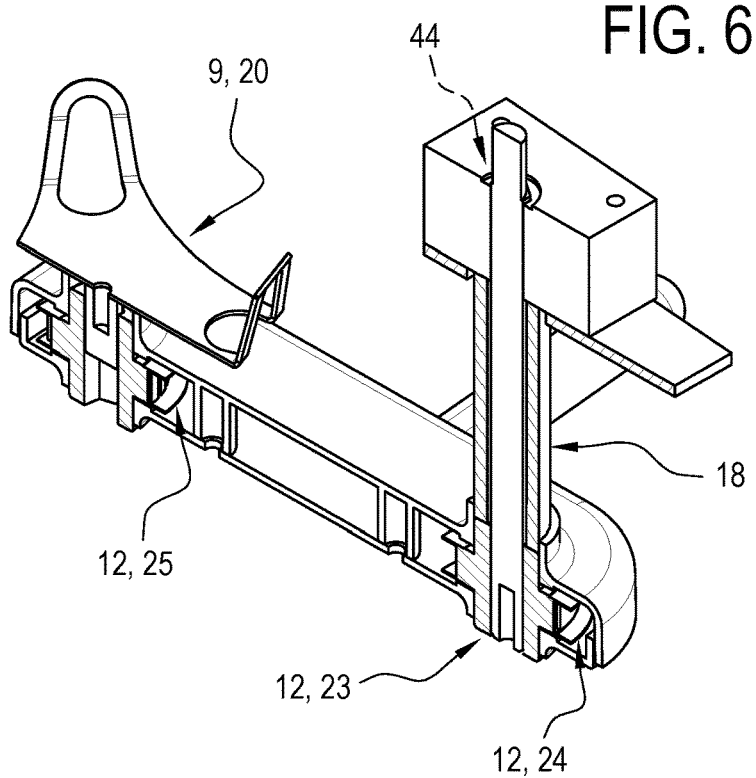
FIGS. 6 and 7 show respective cross sectional views of a detail from FIGS. 2 to 5.
Figure 7:
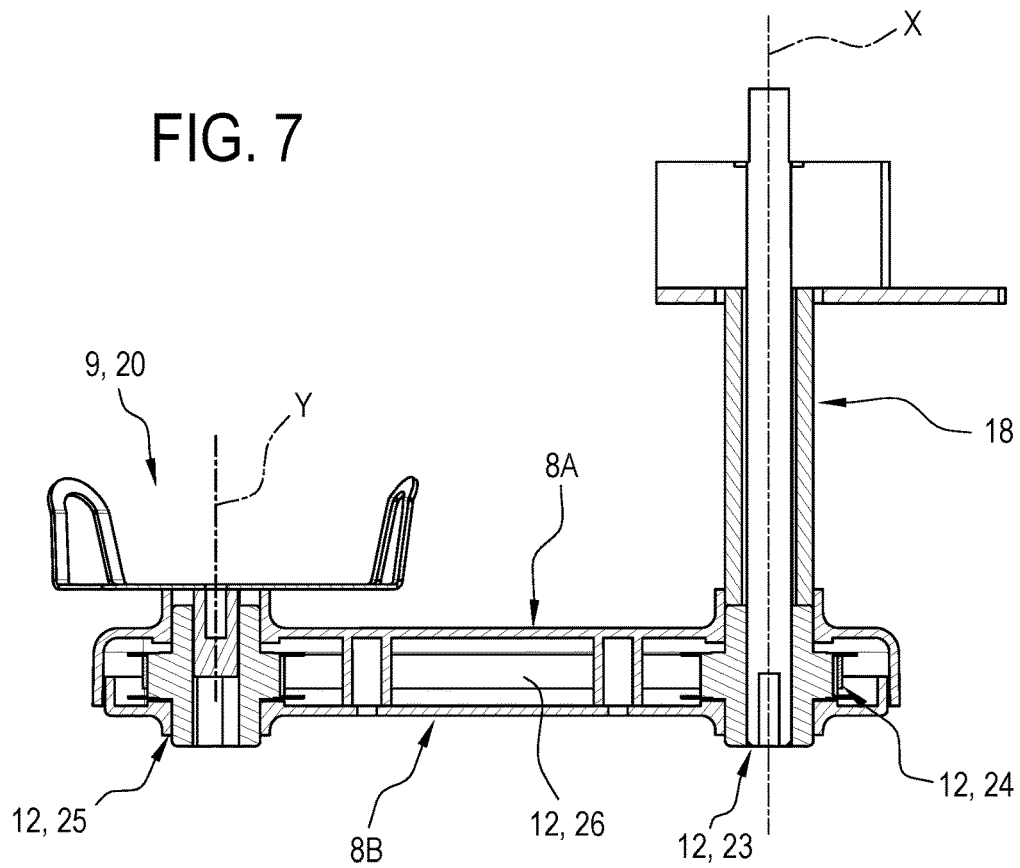
Figure 8:
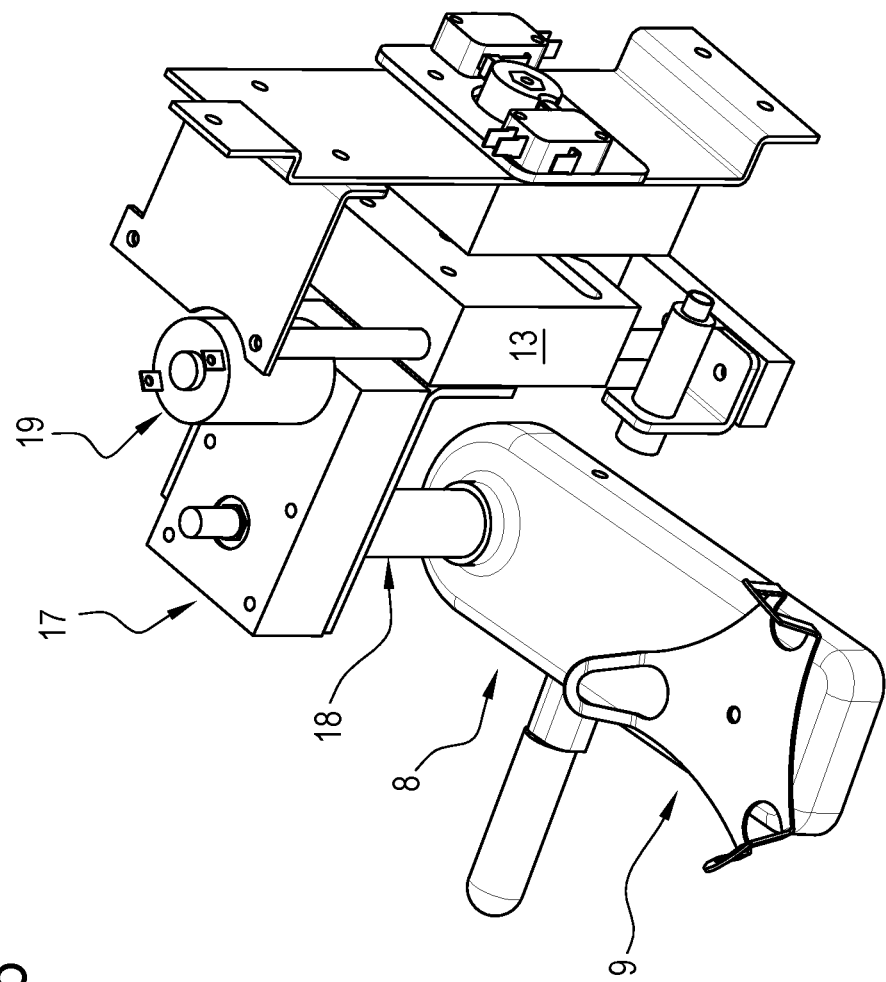
FIG. 8 is another perspective view of the detail of FIGS. 2 to 5.
Figure 9:
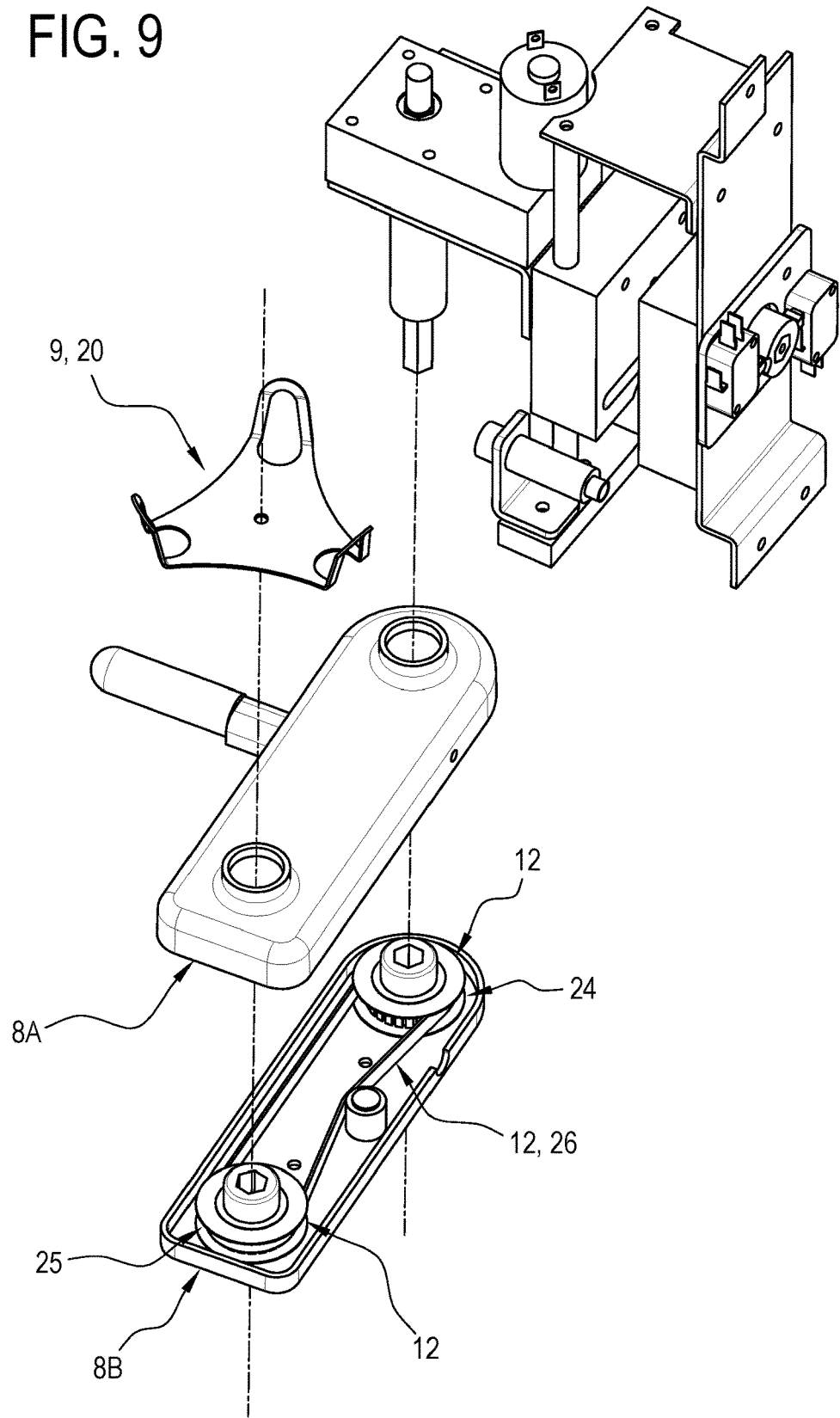
FIG. 9 is a perspective view of the detail of FIG. 8 in a disassembled configuration.
Figure 10:
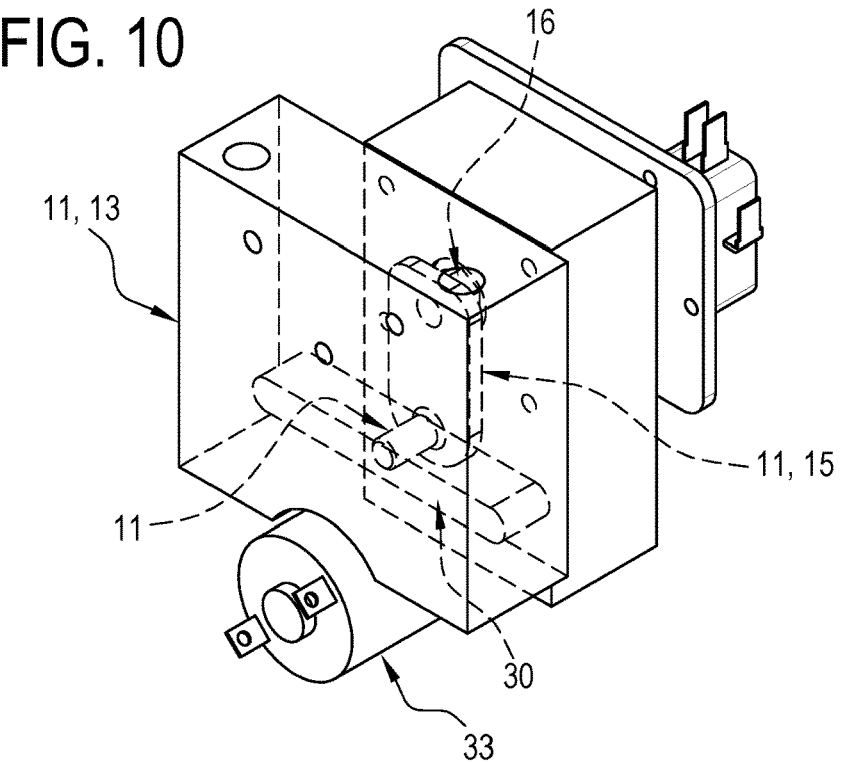
FIGS. 10 and 11 illustrate respective perspective views of a detail of the machine of the preceding figures.
Figure 11:
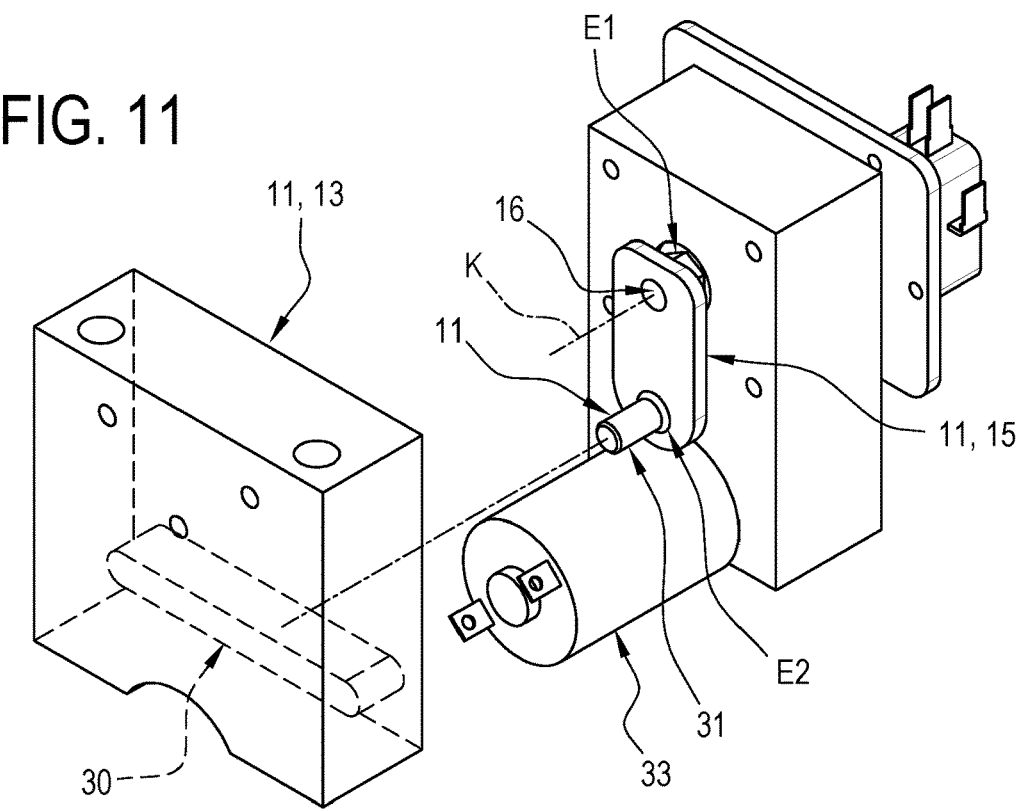

FIGS. 6, 7 and 9 illustrate the means 12 for rotating the seat 9.

In this embodiment, the means 12 for rotating the seat 9 comprise a shaft 23 and a motor 44 (not illustrated but indicated by the dashed arrow in FIG. 6).

The motor 44 is connected to the shaft 23.

Preferably, the shaft 23 is disposed inside the shaft 18.

Preferably, the shaft 23 is rotatable independently of the shaft 18.

It should be noted that the shaft 23 rotatably mounts a first pulley 24 (forming part of the means 12 for rotating the seat 9).

The first pulley 24 is rotatably mounted to the support 8.

The means 12 for rotating the seat 9 also comprise a second pulley 25 mounted rotatably to the support 8.

The second pulley 25 is solidly connected to the housing 9 or to the housing element 20.

The first pulley 24 and the second pulley 25 are connected to each other by a belt 26 (smooth or toothed).

The belt 26 allows transmitting motion from the first pulley 24 to the second pulley 25.

As to the receiving container 10, this may be an ice cream cone or cup or any other suitable type of container.

According to another aspect, the movement means 11 and the means 12 for rotating the housing seat 9 comprise at least one actuator.

According to another aspect, the machine 1 comprises a plurality of supply containers 3 containing the basic mixture and connected to the processing chamber 2 to deliver the basic mixture into the processing chamber 2.

Advantageously, the machine 1, as described in the foregoing, allows dispensing ice cream of predetermined, desired shape with a good degree of repeatability.

In effect, the combination of the vertical (descending) movement and the rotation of the container 10 makes it possible to create a predetermined aesthetic effect as a function of the vertical movement/rotation speeds relative to each other.

More specifically, according to this disclosure, the machine 1 preferably comprises an interface to allow adjusting the rotation speed of the seat 9 and/or the vertical movement speed of the support 8.

Preferably, the interface comprises one or more buttons (physical and/or touch screen type) and/or a display.

It should be noted that the interface is preferably connected to the electronic drive and control unit 5 an interface to allow programming the rotation speed of the seat 9 and/or the vertical movement speed of the support 8.

Also defined is a method for making and dispensing a liquid or semi-liquid product in a machine 1 as described in the foregoing.

The method comprises the following steps:

placing a basic mixture inside the processing chamber 2;

setting the stirrer in rotation and simultaneously thermally treating (cooling) the basic mixture inside the processing chamber 2 in order to make a liquid or semi-liquid product from the basic mixture;

preparing a receiving container 10 in the seat 9 of the support 8;

dispensing the liquid or semi-liquid product through the dispensing nozzle 7 and, at the same time, moving the support 8 vertically and rotating the seat 9.

According yet another aspect of the method, rotation of the seat 9 and movement of the support 8 are at least partly simultaneous.

According to yet another aspect, the step of dispensing the liquid or semi-liquid product through the dispensing nozzle 7 and, at the same time, moving the support 8 vertically and rotating the seat 9 comprises the following step:

setting the seat 9 in rotation and simultaneously moving the support 8 vertically from the top down.

It should be noted that according to this aspect, moving the seat 9 down vertically and simultaneously rotating it allows very easily dispensing the product in the container 10 in the seat 9 while at the same time guaranteeing a very good degree of repeatability of the shape desired by the operator.

The step of setting the seat 9 in rotation and simultaneously moving the support 8 vertically from the top down is preceded by a step of moving the support 8 vertically from the bottom up.

According to another aspect, the step of dispensing the liquid or semi-liquid product through the dispensing nozzle 7 and, at the same time, moving the support 8 vertically and rotating the seat 9 comprises, before the step of moving the support 8 vertically from the bottom up, the step of moving the support 8 in a horizontal plane from a horizontal position P3 where it is spaced apart from the dispensing nozzle 7 to a horizontal position P4 where it is close to the dispensing nozzle 7.

It should be noted that the horizontal, spaced-apart position P3 is a pickup position where the container 10 is positioned in a zone convenient for picking up by the operator.

According to another aspect, the step of moving the support 8 in a horizontal plane from a horizontal position P3 where it is spaced apart from the dispensing nozzle 7 to a horizontal position P4 where it is close to the dispensing nozzle 7 comprises a step of rotating the support 8 about a vertical axis X between the horizontal spaced-apart position P3 and the horizontal close-together position P4.

According to another aspect, the step of dispensing the liquid or semi-liquid product through the dispensing nozzle 7 and, at the same time, moving the support 8 vertically and rotating the seat 9 comprises, before the step of moving the support 8 vertically from the bottom up, the step of moving the support 8 in a horizontal plane from a horizontal position P4 where it is close to the dispensing nozzle 7 to a horizontal position P3 where it is spaced apart from the dispensing nozzle 7.

It should be noted that at the end of this step of moving the support 8 in a horizontal plane from a horizontal position P4 where it is close to the dispensing nozzle 7 to a horizontal position P3 where it is spaced apart from the dispensing nozzle 7, the container 10 with ice cream inside it is ready for withdrawal by the operator or user.

According to another aspect, the step of moving the support 8 in a horizontal plane from a horizontal position P4 where it is close to the dispensing nozzle 7 to a horizontal position P3 where it is spaced apart from the dispensing nozzle 7 comprises a step of rotating the support 8 about a vertical axis X between the horizontal close-together position P3 and the horizontal spaced-apart position P4.

What is claimed is:

1. A machine for making liquid or semi-liquid food products, comprising:
    a processing chamber for processing a basic mixture and including a stirrer and a thermal treatment system for the basic mixture, operating in conjunction with one another to convert the basic mixture into a liquid or semi-liquid product;
    a dispensing device including a dispensing nozzle connected to the processing chamber to deliver the liquid or semi-liquid product,
    a support having a housing seat for housing a receiving container;
    a movement mechanism suitable for vertically moving the support between a vertical position away from the dispensing nozzle and a vertical position close to the dispensing nozzle;
    a rotation mechanism suitable for rotating the housing seat about a vertical axis;
    wherein the movement mechanism comprises a slide, which the support is mechanically connected to, and at least one guide for vertically guiding the slide;
    wherein the movement mechanism comprises: a cantilevered element which is cantilevered from the slide, and a first shaft supported by the cantilevered element and connected to the support;
    a first motor connected to the first shaft and supported by the cantilevered element;
    wherein the rotation mechanism comprises a second shaft and a second motor;
    wherein the second shaft is rotatable independently of the first shaft.

2. The machine according to claim 1, further comprising an electronic drive and control unit and wherein the electronic drive and control unit is operatively connected to the movement mechanism and to the rotation mechanism to drive the movement mechanism and the rotation mechanism.

3. The machine according to claim 1, wherein the support is rotatable relative to the slide about a vertical axis, between a spaced-apart position and a close-together position.

4. The machine according to claim 1, wherein the movement mechanism comprises a conrod, the conrod being slidably connected, at a first end, to the slide.

5. The machine according to claim 4, wherein the conrod is also connected, at a second end opposite to the first end, to a shaft of an actuator.

6. The machine according to claim 1, comprising at least one actuator to drive the movement mechanism and the rotation mechanism.

7. The machine according to claim 1, comprising a plurality of supply containers containing the basic mixture and connected to the processing chamber to deliver the basic mixture into the processing chamber.

8. A method for making and dispensing a liquid or semi-liquid product, comprising the following steps:
    providing a machine comprising:
        a processing chamber for processing a basic mixture and including a stirrer and a thermal treatment system for the basic mixture, operating in conjunction with one another to convert the basic mixture into a liquid or semi-liquid product;
        a dispensing device including a dispensing nozzle connected to the processing chamber to deliver the liquid or semi-liquid product,
        a support having a housing seat for housing a receiving container;
        a movement mechanism suitable for vertically moving the support between a vertical position away from the dispensing nozzle and a vertical position close to the dispensing nozzle;
        a rotation mechanism suitable for rotating the housing seat about a vertical axis;
        wherein the movement mechanism comprises a slide, which the support is mechanically connected to, and at least one guide for vertically guiding the slide;
        wherein the movement mechanism comprises: a cantilevered element which is cantilevered from the slide, and a first shaft supported by the cantilevered element and connected to the support;
        a first motor connected to the first shaft and supported by the cantilevered element;
        wherein the rotation mechanism comprises a second shaft and a second motor;
        wherein the second shaft is rotatable independently of the first shaft;

placing the basic mixture inside the processing chamber;
setting the stirrer in rotation and simultaneously thermally treating the basic mixture inside the processing chamber to make the liquid or semi-liquid product from the basic mixture;
preparing a receiving container in the housing seat of the support;
dispensing the liquid or semi-liquid product through the dispensing nozzle and, at the same time, moving the support vertically and rotating the seat.

9. The method according to claim 8, wherein the rotating the seat and moving the support vertically are at least partly simultaneous.

10. The method according to claim 8, wherein the step of dispensing the liquid or semi-liquid product through the dispensing nozzle and, at the same time, moving the support vertically and rotating the seat comprises the following step:
setting the seat in rotation and simultaneously moving the support vertically from a top down.

11. The method according to claim 10, comprising, before the step of setting the seat in rotation and simultaneously moving the support vertically from the top down, a step of moving the support vertically from a bottom up.

12. The method according to claim 11, wherein the step of dispensing the liquid or semi-liquid product through the dispensing nozzle and, at the same time, moving the support vertically and rotating the seat comprises, before the step of moving the support vertically from the bottom up, a step of moving the support in a horizontal plane from a horizontal position where the support is spaced apart from the dispensing nozzle to a horizontal position where the support is close to the dispensing nozzle.

13. The method according to claim 12, wherein the step of moving the support in a horizontal plane from a horizontal spaced-apart position where the support is spaced apart from the dispensing nozzle to a horizontal close-together position where the support is close to the dispensing nozzle comprises a step of causing the support to rotate about a vertical axis between the horizontal spaced-apart position and the horizontal close-together position.

14. The method according to claim 10, wherein the step of dispensing the liquid or semi-liquid product through the dispensing nozzle and, at the same time, moving the support vertically and rotating the seat comprises, after the step of moving the support vertically from the top down, a step of moving the support in a horizontal plane from a horizontal position where the support is close to the dispensing nozzle to a horizontal position where the support is spaced apart from the dispensing nozzle.

15. The method according to claim 14, wherein the step of moving the support in a horizontal plane from a horizontal position where the support is close to the dispensing nozzle to a horizontal position where the support is spaced apart from the dispensing nozzle comprises a step of rotating the support about a vertical axis between the horizontal close-together position and the horizontal spaced-apart position.

* * * * *